(12) United States Patent
Kuroda et al.

(10) Patent No.: US 9,016,760 B2
(45) Date of Patent: Apr. 28, 2015

(54) ALL-TERRAIN VEHICLE

(71) Applicant: Honda Motor Co., Ltd., Tokyo (JP)

(72) Inventors: Kosuke Kuroda, Wako (JP); Jun Tomiyama, Wako (JP); Erik Dunshee, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 13/853,697

(22) Filed: Mar. 29, 2013

(65) Prior Publication Data

US 2014/0292021 A1 Oct. 2, 2014

(51) Int. Cl.
*B60J 5/04* (2006.01)
*B60R 21/06* (2006.01)

(52) U.S. Cl.
CPC .............. *B60J 5/0487* (2013.01); *B60R 21/06* (2013.01)

(58) Field of Classification Search
CPC ............................ B60J 5/0487; B60R 21/06
USPC ........ 296/146.1, 146.2, 146.5, 146.9, 190.11, 296/190.03; D12/86, 87, 196
See application file for complete search history.

(56) References Cited

U.S. PATENT DOCUMENTS

| | | | |
|---|---|---|---|
| 2,080,714 A * | 5/1937 | Hicks et al. ................ | 296/146.9 |
| 5,127,191 A * | 7/1992 | Ohta ................................ | 49/62 |
| 6,036,255 A * | 3/2000 | Lester et al. ................ | 296/146.1 |
| 6,134,841 A * | 10/2000 | Schneider ........................ | 49/502 |
| D467,851 S * | 12/2002 | Warming ..................... | D12/196 |
| 7,097,237 B2 * | 8/2006 | Weiner et al. ............. | 296/190.11 |
| D606,900 S * | 12/2009 | Flores ............................ | D12/87 |
| D640,171 S * | 6/2011 | Danisi ............................ | D12/87 |
| D642,493 S * | 8/2011 | Goebert et al. ................ | D12/87 |
| 7,988,210 B2 * | 8/2011 | Shibata et al. ................ | 292/340 |
| 8,220,862 B2 * | 7/2012 | Kaita et al. ................. | 296/146.5 |
| 8,328,235 B2 * | 12/2012 | Schneider et al. ........... | 280/748 |
| 8,336,951 B2 | 12/2012 | Ichihara et al. | |
| D675,960 S * | 2/2013 | Hashimoto et al. ........... | D12/87 |
| 8,459,724 B2 * | 6/2013 | Tsumiyama et al. ....... | 296/146.9 |
| 8,465,050 B1 * | 6/2013 | Spindler et al. ............... | 280/749 |
| 8,556,331 B2 * | 10/2013 | Tsumiyama et al. ....... | 296/146.5 |
| 2003/0168882 A1 * | 9/2003 | Naito et al. ................ | 296/146.2 |
| 2010/0019533 A1 * | 1/2010 | Kinoshita et al. .......... | 296/146.6 |
| 2011/0062748 A1 * | 3/2011 | Kaita et al. ................. | 296/146.9 |
| 2011/0156438 A1 * | 6/2011 | Ichihara et al. ............ | 296/181.1 |
| 2011/0260496 A1 * | 10/2011 | Yano .......................... | 296/146.9 |

* cited by examiner

*Primary Examiner* — Gregory Blankenship
(74) *Attorney, Agent, or Firm* — Westerman, Hattori, Daniels & Adrian, LLP

(57) ABSTRACT

An all-terrain vehicle includes a seat extending in a vehicle width direction and capable of accommodating a driver and at least one passenger, and a door provided on a lateral side of a vehicle body and openable and closable for allowing the driver and the passenger to enter and exit the vehicle. The door is open at an upper part thereof so that in a side view of the vehicle, a face of the driver or passenger is visible from the outside. A top edge of the door has a first region overlapping the driver or the passenger and a second region other than the first region. The top edge is higher at the first region than at the second region.

7 Claims, 3 Drawing Sheets

ALL-TERRAIN VEHICLE

FIELD OF THE INVENTION

The present invention relates to an improvement in an all-terrain vehicle.

BACKGROUND OF THE INVENTION

All-terrain vehicles designed to travel over wilderness or other rough terrain are known in, for example, U.S. Pat. No. 8,336,951.

The all-terrain vehicle disclosed in U.S. Pat. No. 8,336,951 includes a door provided on a lateral side of a vehicle body. The door is disposed between a front pillar and a center pillar located rearwardly of the front pillar. The door is attached to the front pillar so as to be capable of opening and closing about a hinge. Road wheels throw up mud while the vehicle is traveling. This mud must be prevented from reaching a vehicle occupant. Inasmuch, a mud guard is provided on the door to counteract the ingress of mud. However, a side panel is integrated with the center pillar and accordingly can be a hindrance when the vehicle occupant enters or exits the vehicle. There is demand for a side panel arrangement structure that does not pose a hindrance.

SUMMARY OF THE INVENTION

An object of the present invention is to provide an all-terrain vehicle which is capable of securing satisfactory ease of egress and ingress without hindering egress and ingress of a vehicle occupant.

According to the present invention, there is provided an all-terrain vehicle comprising: a seat extending in a width direction of the vehicle and capable of accommodating a driver and at least one passenger; and a door provided on a lateral side of a vehicle body and openable and closable for allowing the driver and the passenger to enter and exit the vehicle, wherein the door is open at an upper part thereof so that in a side view of the vehicle, a face of the driver or passenger is visible from the outside, and the door has a top edge having a first region overlapping the driver or the passenger and a second region other than the first region, the top edge being higher at the first region than at the second region.

Thus, the upper part of the door is open so that the face of the driver or passenger is visible from the outside, and the top edge of the door includes the first region that overlaps the driver or the passenger. Because the first region that overlaps the driver or the passenger constitutes part of the door, this region does not hinder entering or exiting the vehicle. Because the height of the top edge of the door is higher at the first region that overlaps the driver or the passenger than at the second region other than the first region, the vehicle can have a more pleasing appearance than when the height of the top edge of the door in the region that overlaps the driver or the passenger is level with the height of the top edge of the other region or lower than the height of the top edge of the other region, because of the greater area covering the sides of the driver and the passenger. As a result, the vehicle possesses satisfactory ease of egress and ingress and improved appearance. Furthermore, the mud-splashing preventive effect of the vehicle is improved.

Preferably, the top edge of the door slopes upwards from a front end thereof toward a rear end thereof in a longitudinal direction of the vehicle. Because the height of the front end of the door is lower than the rear end, a front wheel positioned in front of the door is easily seen by the driver. The vehicle can thereby be steered and operated more easily than when the height of the front end of the door is level with the height of the rear end or the height of the front end of the door is higher than the rear end.

In one preferred form of the invention, the door is a front door, and a rear door is provided rearwardly of the front door; and the rear door has a top edge having a front end located at substantially the same height as the first region of the top edge of the front door that overlaps the driver or the passenger, the top edge of the rear door sloping downwardly and rearwardly in the longitudinal direction of the vehicle. The appearance of the vehicle can be further improved because the rear end top edge of the front door and the front end top edge of the rear door are of the same height, and the top edges of the front door and the rear door are aligned. If the sitting position of the rear seat is designed to be lower than the sitting position of the front seat, the region where the rear part of the rear door and the passenger sitting in the rear seat overlap are of the same height as the same region of the front seat even if the rear part of the rear door is lowered.

Preferably, the door has a bottom edge sloping upwardly and rearwardly in a longitudinal direction of the vehicle. Because the front part of the bottom edge of the door is low and the rear part of the bottom edge is high, a vehicle occupant easily accommodates their legs when entering and exiting the vehicle. Additionally, the weight of the door can be reduced in proportion to the rearward and upward extending in comparison with cases in which the door extends horizontally. Being of less weight, the door is easier to open and close.

Preferably, the vehicle body is provided with a side net, the side net overlapping the door in a side view of the vehicle, and the side net has a portion located inwardly of the door in the width direction of the vehicle and attached to the vehicle body in a location lower than the top edge of the door. Because of the portion of the side net extending lower than the top edge of the door so as to reach farther inward in the vehicle width direction than the door, there is not likely to be a gap through which leaves and other foreign objects, for example, can enter.

DETAILED DESCRIPTION OF THE PREFERRED EMBODIMENT

One preferred embodiment of the present invention will be described below in detail with reference to the accompanying sheets of drawings. The terms "top," "bottom," "front," "rear," "left," and "right" used herein indicate directions from the viewpoint of a driver riding in an all-terrain vehicle.

Figure 1:
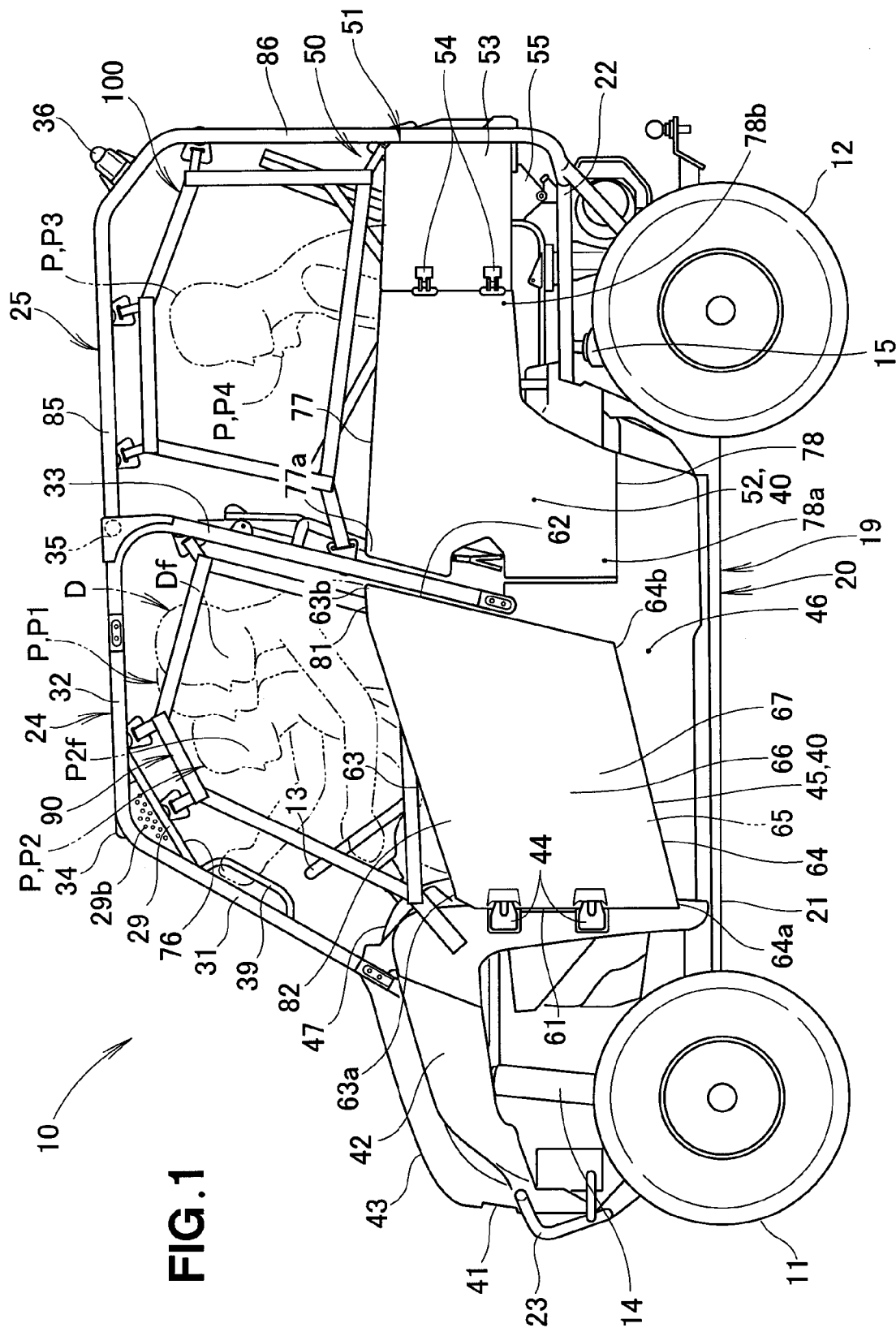
FIG. 1 is a left side view of an all-terrain vehicle according to the present invention.

As shown in FIG. 1, a vehicle 10 is a left-hand drive all-terrain vehicle having four wheels in independent suspension so that the vehicle is capable of traveling on uneven terrain. Left and right front wheels 11 are independently suspended in a front part of a vehicle body 19 that includes a vehicle body frame 20, and left and right rear wheels 12 are independently suspended in a rear part of the vehicle body frame 20. A steering wheel 13 is provided on the left side in the present embodiment, but not by way of limitation; the steering wheel may be provided on the right side.

The vehicle body frame 20 has a center frame 21 disposed in the vehicle widthwise middle and extending in a longitudinal or front-back direction of the vehicle, a rear frame 22 extending from above the middle of the center frame 21 past the rear thereof and parallel thereto, a bumper 23 mounted to a front end portion the center frame 21 and protecting a front part of the vehicle 10, a front seat roll bar 24 provided on a front upper part of the center frame 21 and having an arcuate shape in a side view, and a rear seat roll bar 25 provided so as to extend rearward from an upper rear end of the front seat roll bar 24 and having an L shape in a side view.

The front part of the vehicle 10 has a front cover 41 provided at and covering a front end part of the vehicle 10, front fenders 42 provided on a rear part of the front cover 41 and covering upper and rear parts of the front wheels 11 from above, a front upper cover 43 provided on respective upper parts of the front fenders 42 and covering a front upper part of the vehicle 10, and front doors 45 provided on respective rear parts of the front fenders 42 so as to be openable and closable via hinges 44.

A rear part of the vehicle 10 has side covers 46 disposed in the rear parts of the front doors 45 and covering the side parts of the vehicle 10, and rear side covers 51 disposed to the rear of the top parts of the side covers 46 and forming a luggage carrier 50. Each of the rear side covers 51 has a front part configured from a rear door 52 and a rear part configured from a rear panel 53 attached to the vehicle body frame 20. The rear door 52 is provided on a front end of the rear panels 53 such that the rear door 52 can be opened and closed via hinges 54.

The luggage carrier 50 is supported on the rear frame 22 via a stay 55. The front wheels 11 are supported by front cushions 14, and the rear wheels 12 are supported by rear cushions 15. An instrument panel 47 is disposed rearwardly of the front upper cover 43, and the steering wheel 13 is disposed in proximity to the instrument panel 47.

Figure 2:
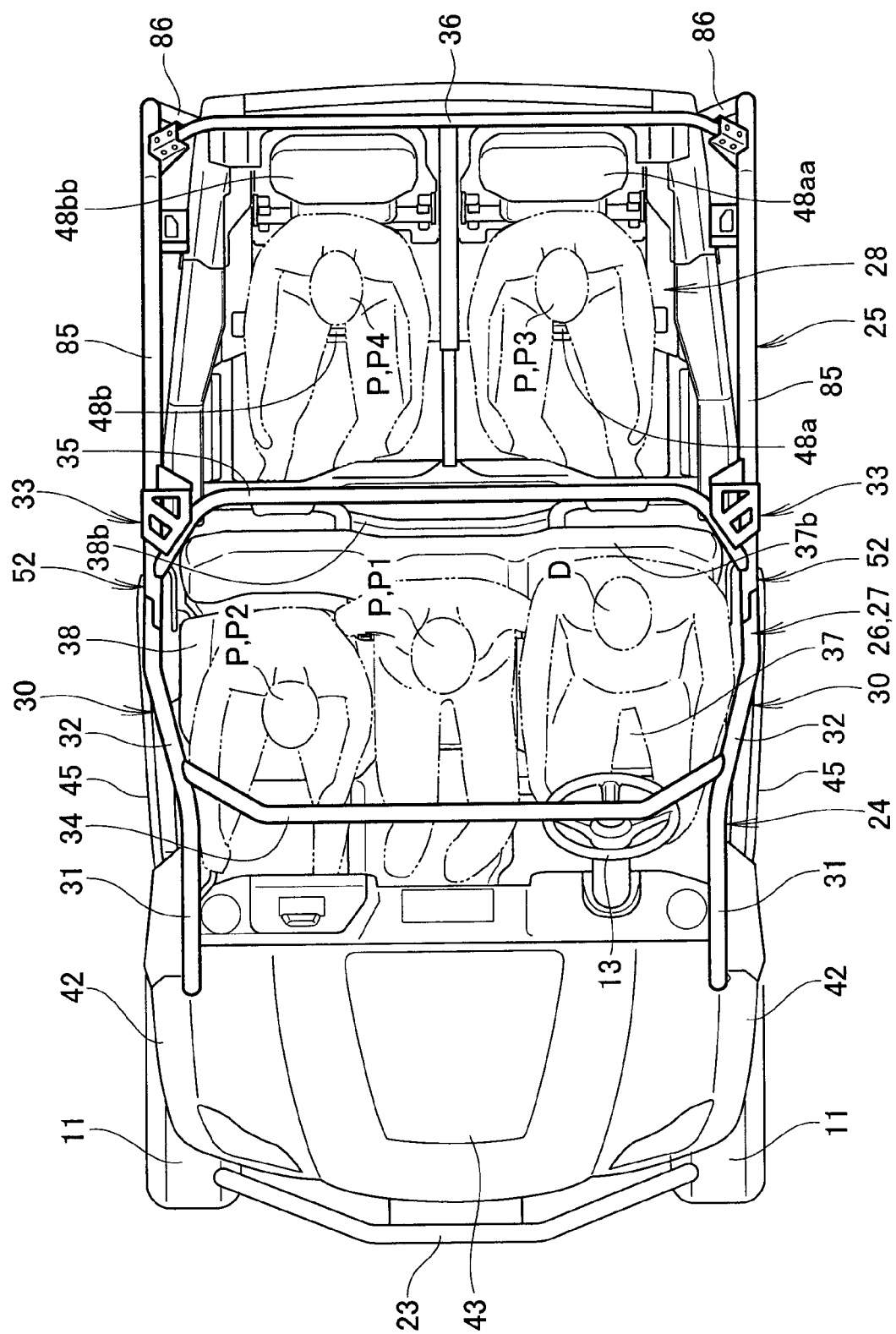
FIG. 2 is a plan view of the all-terrain vehicle.

As shown in FIG. 2, the front seat roll bar 24 has left and right front pillars 31, 31 extending rearward and upward from respective upper ends of the front fenders 42, left and right front roof side rails 32, 32 extending rearward from upper ends of the left and right front pillars 31, 31, support pipes 29, 29 (see FIG. 1) spanning respectively between the left and right front pillars 31, 31 and the left and right front roof side rails 32, 32, left and right center pillars 33, 33 (see FIG. 1) extending downward from respective rear parts of the left and right front roof side rails 32, 32, a top middle cross pipe 35 spanning between the left and right center pillars 33, 33, a front upper cross pipe 34 spanning between the upper ends of the left and right front pillars 31, and a frame-side grip 39 (see FIG. 1) provided on the right front pillar 31 for being grasped by a vehicle occupant P. In FIG. 1, support plates 29b, 29b span through the portion enclosed by the left and right front pillars 31, 31, the left and right front roof side rails 32, 32, and the support pipes 29, 29.

As shown in FIG. 2, left and right middle side pipes 30, 30 are configured respectively from the left and right front pillars 31, 31, the left and right front roof side rails 32, 32 extending rearward from the upper ends of the left and right front pillars 31, 31, and the left and right center pillars 33, 33 extending downward from the rear parts of the left and right front roof side rails 32, 32.

The rear seat roll bar 25 has left and right rear roof side rails 85, 85 extending rearward from the upper ends of the left and right center pillars 33, 33, left and right rear pillars 86, 86 extending downward from the rear ends of the left and right rear roof side rails 85, 85, and a rear upper cross pipe 36 spanning between the rear parts of the left and right rear roof side rails 85, 85.

Seats 26 comprise a front seat 27 and a rear seat 28 located rearward of the front seat 27. The front seat 27 comprises, from left to right in the lateral or vehicle-width direction, a driver seat 37 in which a driver D sits and manually operates the steering wheel 13, and a front side passenger seat 38 provided in alignment with the driver seat 37, where two passengers P1, P2 constituting passengers P sit side-by-side. Specifically, the front seat 27 extends in the vehicle-width direction is able to accommodate the driver D and the two passengers P1, P2. The driver D and the passengers P1, P2 can enter or exit the vehicle by opening and closing the front doors 45. A single passenger may also sit in the front side passenger seat 38.

The driver seat 37 has a driver seat back 37b on which the back of the driver D rests, and the front side passenger seat 38 has a front seat passenger seat back 38b on which the backs of the passengers P1, P2 rest. The rear seat 28 comprises rear seat passenger seats 48a, 48b in which two passengers P3, P4 can sit. Specifically, the rear seat 28 is a type of seat divided to the left and right, and the rear seat also serves as a luggage carrier in which luggage can be loaded. The left passenger seat 48a has a rear seat passenger seat back 48aa, and the right passenger seat 48b has a rear seat passenger seat back 48bb. These left and right rear seat passenger seat backs 48aa, 48bb can be leaned forward individually, whereby the luggage carrier 50 (see FIG. 1) can be expanded forward.

Next, the doors 40 are described.

Referring back to FIG. 1, in a side view of the vehicle, the doors 40 comprise the left and right front doors 45, 45 (only the symbol 45 nearest the viewer is shown) whereby the driver D and the passengers P (the front seat passengers P1, P2) can enter and exit the vehicle, and the left and right rear doors 52, 52 (only the symbol 52 nearest the viewer is shown) provided rearwardly of the left and right front doors 45, 45, whereby passengers (the rear seat passengers P3, P4) can enter and exit the vehicle. The left and right center pillars 33, 33 (only the symbol 33 nearest the viewer is shown) are disposed respectively between the left and right front doors 45, 45 and the left and right rear doors 52, 52.

Each of the left and right front doors 45, 45 and the left and right rear doors 52, 52 is disposed in bilateral symmetry to the other relative to a longitudinal centerline of the vehicle. Therefore, the left front door 45 and the left rear door 52 are described, and descriptions of the right front door 45 and the right rear door 52 are omitted.

The left front door 45 has a front edge 61 and a rear edge 62 extending vertically, a top edge 63 extending between an upper end of the front edge 61 and an upper end of the rear edge 62, and a bottom edge 64 extending between a lower end of the front edge 61 and, a lower end of the rear edge 62. A first outer plate surface 65 is formed in the area enclosed by the front edge 61, the rear edge 62, the top edge 63, and the bottom edge 64. The first outer plate surface 65 is covered from a lateral outer side by a left door decorative plate 67 having a second outer plate surface 66. The left front door 45 is made of an uncoated substantially black resin, for example, and is covered by the coated left door decorative plate 67 depending on the design of the vehicle, whereby cost increases can be minimized and additional designs to the vehicle can be easily accommodated.

An upper part of the door 40 is opened so that the face Df of the driver D and the face P2f of the passenger P2 can be seen from the outside. The door 40 and the front seat roll bar 24 define therebetween an opening 76, and window glass is not provided in the opening 76. Instead, a side net 90 is put up over the opening 76. The side net is described hereinafter.

In the top edge 63 of the front door 45 constituting the door 40, one region 81 is higher than another region 82, the first region 81 being where the driver and the passenger overlap when seen from the side of the vehicle. In the illustrated embodiment, the top edge 63 of the door 45 slopes upwards from a front end 63a toward a rear end 63b in the longitudinal or front-back direction of the vehicle. Specifically, the rear end top edges 63b, 63b (only the symbol 63b nearest the viewer is shown) of the left and right front doors 45, 45 are higher than the front end top edges 63a, 63a (only the symbol 63a nearest the viewer is shown) of the left and right front doors 45, 45. The first region 81 of the top edge 63 is located above an imaginary straight line connecting a front end 63a and a rear end 63b of the top edge 63. The top edge 63 of the door 40 slopes upwards from a front end 63a thereof to a rear end 63b thereof, in a longitudinal direction of the vehicle. The another region 82 of the top edge 63 is located forward of the first region 81. The first region 63a of the top edge 63 has a slope angle smaller than a slope angle of the second region 63b of the top edge 63.

The bottom edge 64 of the front door 45 extends upwards in a rearward direction of the vehicle. Specifically, rear bottom edges 64b of the left and right front doors 45 are higher than front bottom edges 64a of the left and right front doors 45, and rear bottom edges 78b of the left and right rear doors 52 are higher than front bottom edges 78a of the left and right rear doors 52.

The vertical relationship between the top edge 63 of the front door 45 and the top edge 77 of the rear door 52 is such that in the top edge 77 of the rear door 52, a front part 77a is substantially at the same height as the first region 81 of the front door 45 that overlaps the driver D or the passengers P.

Figure 3:
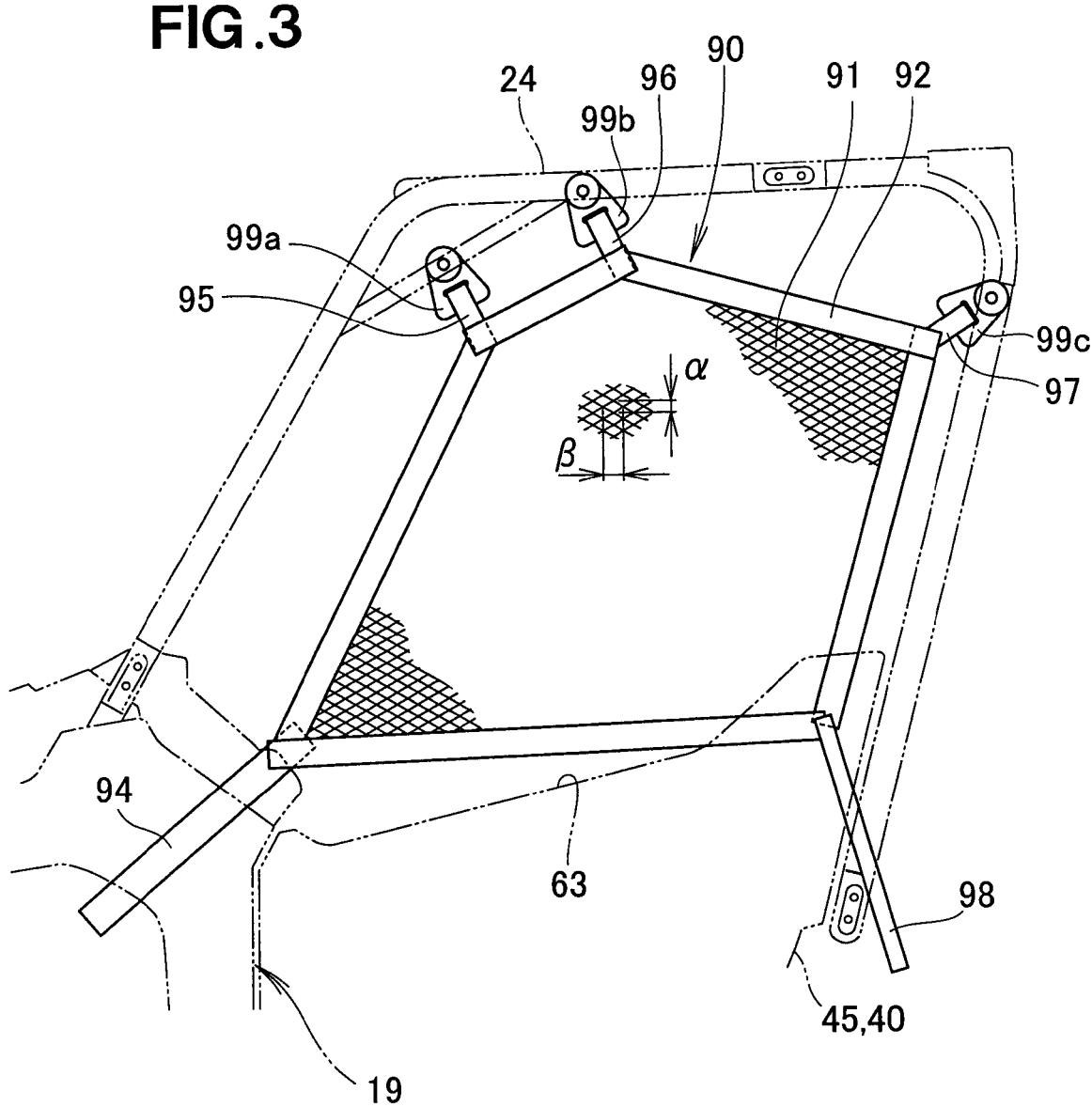
FIG. 3 is a view explanatory of a side net attached to a front seat roll bar.

As shown in FIG. 3, in a side view of the vehicle, the vehicle body 19 is provided with a side net 90 such that part of the side net 90 overlaps the front door 45. The side net 90 is composed of a net main body 91 formed as a mesh, a belt 92 in the form of an elongate strip that encloses a peripheral edge of the net main body 91 and constitutes a frame, and first through fifth auxiliary belts 94 to 98 appended to the belt 92, extending in a radial outward direction from the belt 92, and attached to the vehicle body.

The first auxiliary belt 94 is removably attached to the vehicle body 19 via a buckle (not shown), and the second through fourth auxiliary belts 95 to 97 are attached to the front seat roll bar 24 via respective brackets 99a to 99c. The first auxiliary belt 94 and the fifth auxiliary belt 98, which constitute part of the side net 90, are attached to the vehicle body 19 so as to reach farther laterally inward than the front door 45. The fifth auxiliary belt 98 is attached to the vehicle body 19, and in its free state (when the door is open) the fifth auxiliary belt 98 lies in a plane located laterally outward of a plane in which an inner surface of the door 45 extends when the door 45 is closed. Thus, when the door 45 is closed, the fifth auxiliary belt 98 naturally fits tightly along the inner surface of the door 45. Part of the side net 90 extends farther down than the top edge 63 of the front door 45 so as to reach farther laterally inward than the front door 45, and accordingly a gap through which, e.g., leaves and other objects can enter is less likely to form. The mesh net main body 91 has a rectangular mesh having a vertical dimension α and a horizontal dimension β. The dimensions α, β of the mesh can be designed as desired.

Next is a description of the action of the vehicle for travel on uneven terrain described above.

In FIG. 1, in the top edge 63 of the door 45, the second region 82 is lower than the first region 81 that overlaps the driver D or the passengers P (P1, P2). Specifically, because the top edge height of the door 45 is higher at the first region 81 that overlaps the driver D or the passengers P than at the second region 82, the outward appearance of the vehicle can be made better than when the top edge height of the door 45 in the first region 81 that overlaps the driver D or the passengers P is either level with the top edge height of the second region 82 or lower than the top edge height of the second region 82, because the sides of the driver D and the passengers P can be covered. The effect of preventing mud splashing is also improved.

Additionally, because the first region 81 that overlaps the driver D and the passengers P constitutes the door 45, the outward appearance of the vehicle is improved, and the vehicle can secure satisfactory easy of egress and ingress of the driver or a passenger.

The top edge 63 of the door 45 slopes upwards from the front end 63a toward the rear end, 63b. Specifically, the height of the front end 63a of the door 45 is lower than that of the rear end 63b, and the front wheels 11 positioned in front of the door 45 are therefore easily visible. The vehicle can thereby be driven and operated more easily than in cases in which the height of the front end 63a of the door 45 is level with the height of the rear end 63b, or cases in which the height of the front end 63a of the door 40 is higher than the rear end 63b.

The bottom edge 64 of the front door 45 extends upwards in a rearward direction of the vehicle. Specifically, because the height of the front end bottom edge 64a of the bottom edge 64 of the door 45 is low and the rear end bottom edge 64b of the bottom edge 64 is high, a vehicle occupant can accommodate their legs easily when entering and exiting the vehicle. Additionally, the weight of the front door 45 can be reduced in proportion to the rearward and upward extending in comparison with cases in which the door extends horizontally. Opening and closing the front door 45 is made easier by reducing the weight of the front door 45.

In the top edge 77 of the rear door 52, the front part 77a is substantially at the same height as the first region 81 that overlaps the driver D and the passengers P. Specifically, the outward appearance of the vehicle can be further improved because the rear end top edge 63b of the front door 45 and the front end top edge 77a of the rear door 52 are matched at substantially the same height, and the heights of the top edge 63 of the front door 45 and the top edge 77a of the rear door 52 are aligned.

An upper part of the rear door 52, which is located above the top edge 77 of the rear door 52, is open in the same manner as how the upper part of the front door 45 is open. Because the top edge 77 of the rear door 52 slops downwards in the rearward direction of the vehicle, in a side view of the vehicle, the height of the top edge 77 of the rear door 52, in a region where the rear part of the rear door 52 and the passengers P3, P4 sitting in the rear seat 28 overlap, is lower than the height of the top edge 63 of the front door 45 at the first region 81 where the front seat 27 overlaps with the vehicle occupants D, P1, P2.

Because the sitting position of the rear seat 28 is designed to be lower than the sitting position of the front seat 27, the sides of the passengers P3, P4 can be covered up to higher levels by the top edge 77 of the rear door 52 than when the sitting position of the rear seat 28 is designed to be lower than the sitting position of the front seat 27. Specifically, the sides of the passengers P3, P4 can be covered by the top edge 77 of the rear door 52 to the same extent as the range whereby the sides of the vehicle occupants D, P1, P2 are covered by the top edge 63 of the front door 45. As a result, the outward appearance of the vehicle can be further improved.

The side net 90 is attached to the vehicle body 19 so as to overlap the door 45. If the side net 90 is disposed adjacent to the door 45 in the lateral or vehicle-width direction, the gap between the side net 90 and the door 40 decreases, and larger sitting space for the vehicle occupants can therefore be ensured.

A side net 100 similar to that of the front seat 27 is provided to the side of the rear seat 78 as well, but the essential structure is no different from that of the side net 90 for the front seat, and a description thereof is omitted.

The present invention has been described herein based on an embodiment applied to an all-terrain vehicle, but the present invention may also be applied to other ordinary vehicles.

As shall be apparent, various minor changes and modifications of the present invention are possible in light of the above teaching. It is therefore to be understood that within the scope of the appended claims the invention may be practiced otherwise than as specifically described.

What is claimed is:

1. An all-terrain vehicle comprising:
    a seat extending in a width direction of the vehicle and capable of accommodating a driver and at least one passenger; and
    a door provided on a lateral side of a vehicle body and openable and closable for allowing the driver and the passenger to enter and exit the vehicle,
    wherein the door is open at an upper part thereof so that in a side view of the vehicle, a face of the driver or passenger is visible from the outside,
    wherein the door has a top edge having a first region overlapping the driver or the passenger and a second region other than the first region, the top edge being higher at the first region than at the second region,
    wherein the vehicle body is provided with a side net attached to the vehicle body at a front and rear of the side net, the side net overlapping at least a portion of the door corresponding to the first region, in a side view of the vehicle, and
    wherein the door is openable and closable independently of movement of the side net.

2. The all-terrain vehicle of claim 1, wherein the top edge of the door slopes upwards from a front end thereof toward a rear end thereof in a longitudinal direction of the vehicle.

3. The all-terrain vehicle of claim 2,
    wherein the door is a front door, and a rear door is provided rearwardly of the front door,
    wherein the rear door has a top edge having a front end located at substantially the same height as the first region of the front door that overlaps the driver or the passenger, and
    wherein the top edge of the rear door slopes downwardly and rearwardly in the longitudinal direction of the vehicle.

4. The all-terrain vehicle of claim 1, wherein the door has a bottom edge sloping upwardly and rearwardly in a longitudinal direction of the vehicle.

5. The all-terrain vehicle of claim 1,
    wherein the side net has a portion located inwardly of the door, in the width direction of the vehicle, and attached to the vehicle body in a location lower than the top edge of the door.

6. The all-terrain vehicle of claim 1, wherein the first region of the top edge is located above an imaginary straight line connecting a front end and a rear end of the top edge.

7. The all-terrain vehicle of claim 1,
    wherein the top edge of the door slopes upwards from a front end thereof to a rear end thereof, in a longitudinal direction of the vehicle,
    wherein the second region of the top edge is located forward of the first region, and
    wherein the first region of the top edge has a slope angle smaller than a slope angle of the second region of the top edge.

* * * * *